US007270522B2

(12) United States Patent
Murthy et al.

(10) Patent No.: US 7,270,522 B2
(45) Date of Patent: Sep. 18, 2007

(54) CONTINUOUS PRESS FOR MANUFACTURING BIODEGRADABLE PLATES

(75) Inventors: Kestur Venkatesh Murthy, Karnataka (IN); Sankaramthadathil Gangadharan Jayaprakashan, Karnataka (IN); Mahadevaiah Shivakumar, Karnataka (IN); Arugakeerthi Chakravarthi, Karnataka (IN)

(73) Assignee: Council of Scientific and Industrial Research, New Delhi (IN)

( * ) Notice: Subject to any disclaimer, the term of this patent is extended or adjusted under 35 U.S.C. 154(b) by 271 days.

(21) Appl. No.: 11/155,041

(22) Filed: Jun. 17, 2005

(65) Prior Publication Data

US 2006/0159792 A1 Jul. 20, 2006

Related U.S. Application Data

(63) Continuation-in-part of application No. PCT/IB02/05490, filed on Dec. 19, 2002.

(51) Int. Cl.
*B29C 51/22* (2006.01)
*B29C 51/42* (2006.01)

(52) U.S. Cl. ...................... 425/143; 425/345; 425/395; 425/400; 425/407

(58) Field of Classification Search ................ 425/143, 425/345, 361, 385, 400, 394–395, 407–408
See application file for complete search history.

(56) References Cited

U.S. PATENT DOCUMENTS

| | | | | |
|---|---|---|---|---|
| 4,778,439 | A * | 10/1988 | Alexander .................. | 425/398 |
| 5,800,846 | A * | 9/1998 | Hart ........................... | 425/388 |
| 5,919,496 | A * | 7/1999 | Padovani .................... | 425/341 |
| 6,641,515 | B2 * | 11/2003 | Ferri et al. .................. | 493/158 |

* cited by examiner

*Primary Examiner*—Yogendra N. Gupta
*Assistant Examiner*—Thu Khanh T. Nguyen
(74) *Attorney, Agent, or Firm*—Frommer Lawrence & Haug LLP; Thomas J. Kowalski; Anne-Marie C. Yvon

(57) ABSTRACT

Provided is a continuously operating pressing machine for the manufacture of biodegradable plates made from plant parts. The machine particularly relates to the continuous preparation of articles such as cups as cups, saucers, plates etc. from plant parts such as leaves/sheaths. The articles thus prepared are useful for various purposes, particularly for serving food or holding food particles.

19 Claims, 3 Drawing Sheets

CONTINUOUS PRESS FOR MANUFACTURING BIODEGRADABLE PLATES

REFERENCE TO RELATED APPLICATIONS

This application is a continuation-in-part of International Patent Application PCT/IB02/05490 filed Dec. 19, 2002 and published as WO 04/056544 on Jul. 8, 2004. Each of the above referenced applications, and each document cited in this text ("application cited documents") and each document cited or referenced in each of the application cited documents, and any manufacturer's specifications or instructions for any products mentioned in this text and in any document incorporated into this text, are hereby incorporated herein by reference; and, technology in each of the documents incorporated herein by reference can be used in the practice of this invention.

It is noted that in this disclosure, terms such as "comprises", "comprised", "comprising", "contains", "containing" and the like can have the meaning attributed to them in U.S. Patent law; e.g., they can mean "includes", "included", "including" and the like. Terms such as "consisting essentially of" and "consists essentially of" have the meaning attributed to them in U.S. Patent law, e.g., they allow for the inclusion of additional ingredients or steps that do not detract from the novel or basic characteristics of the invention, i.e., they exclude additional unrecited ingredients or steps that detract from novel or basic characteristics of the invention, and they exclude ingredients or steps of the prior art, such as documents in the art that are cited herein or are incorporated by reference herein, especially as it is a goal of this document to define embodiments that are patentable, e.g., novel, nonobvious, inventive, over the prior art, e.g., over documents cited herein or incorporated by reference herein. And, the terms "consists of" and "consisting of" have the meaning ascribed to them in U.S. Patent law; namely, that these terms are closed ended.

TECHNICAL FIELD

The present invention relates to a continuous bio-plate casting machine for the preparation of articles from plant parts. The present invention particularly relates to a continuous bio-plate casting machine for the preparation of articles such as cups, saucers, plates etc. from plant parts such as leaves/sheaths. The articles thus prepared are useful for various purposes, particularly for serving food or holding food articles. The invention relates to a device useful for making the articles employing the process mentioned above.

BACKGROUND ART

Traditionally plant residues such as leaves, areca palm sheaths have been used in India as raw material for forming different articles such as plates, cups, saucers etc. for serving food. These articles are hitherto prepared by various methods. A few of the very commonly used methods are explained below.

Normally, plates are formed by stitching the leaves/sheaths into desired shape. More commonly, plates are formed by stapling several leaves together using split plant stems pins. Leaves such as that of Butea or Bauhunia plant are washed and softened and placed on a flat surface and depending on the plate size desired, two or more of the leaves are stitched together at the edges, or stapled using small sharp pins made of twigs or coconut ribs manually. The stitched plates are then dried in shade and are used as leaf plates.

For making small cups the leaves of Butea, Bauhunia or any other leaves such as Banana or sheaths of areca palm, are washed, softened and folded to form the desired shape. The folding provides the dimple or shape of a cup, and the folds are fixed by stitching or by stapling using pins made of plant twigs or coconut leaf ribs manually. The folded stitched cups are dried to retain the shape and rigidity.

The articles made from leaves and sheaths according to the methods explained above have enjoyed the advantage of being biodegradable and eco-friendly. Cups and saucers of this nature have been traditionally used for vending of butter and other semi-solid materials.

However, such articles have the disadvantage of being held together with plant stem pins, stitching, leaves, crevices leading to harboring of micro organisms, due to conditions under which they are prepared, poor physical strength and irregular dimensions and lack of elegance.

The Applicants have previously developed a manually operated bio-plate casting machine. The device is shown in FIG. 1 is being currently used.

The device has a main frame (g), movable die (a) and a stationary punch (b). Electric coils (c), heats the punch for thermosetting of the bio-plates. A thermostat (d) not shown in the figure controls the temperature of the punch to the preset temperature. The untrimmed plant leaf is kept in between the jaws of punch and the die and force is applied manually. The toggle mechanism (e) transmits the load to the movable die and to the plant leaf. The person operating the machine stands at the end of the toggle (f) for the application of the force. Trimming of the plates and cups to its final shape is done manually. A panel board (h) is provided for housing all the electricals. The time of heat treatment depends on the thickness of the plant leaf and the moisture content and the same is controlled manually. The production capacity of this machine is around 120 nos./h. The machine is labor intensive and the quality of casting depends on the skill of the operator.

Applicants co-pending Indian patent application no. 2305/Del/95 dated Dec. 13, 1995 also provides a bio-plate casting machine. FIG. 2 of the accompanying drawings show the device described in the Applicants co-pending Indian Patent Application No. 2305/Del/95.The device comprises of a die-set (1), press cylinder (2), ejection cylinder (3), discharge cylinder (4), ejector (5) heating coil (6), photo sensor (7), the main frame (8), pneumatic solenoid valves (9), air hoses (10), timers (11), counter (12), temperature controller (13), a control panel (14), air compressor (15) and anti-vibration mounts (16).

The device comprises of: a frame (8) to which a die set (1) is fixed, the die set (1) comprises of a punch (1*a*) and a die (1*b*), a gap is provides between the punch and the die for feeding the plant leaf material to be shaped. A plurality of solenoid valves (9) and a discharge cylinder (4) being fixed to the sides of the main frame (8), the discharge cylinder (4) being fixed above the solenoid valves (9), the ejector (5) being housed inside the die set (1), and being connected to an ejector cylinder (3) for facilitating the vertical movement of the ejector (5), the punch (1*a*) connected to a press cylinder (2) for providing vertical movement to the punch (1*a*), the punch (1*a*) housing the heating coil (6) and provided at its bottom a cutting edge in the die (1*b*) housing a photo sensor (7) for actuating the solenoid valves (9), the control panel (14) comprising of a temperature controller (13) the output of which being connected to the input of a heating coil (6) and the electric current for heating the coil being supplied through this output, the output of the heating coil (6) being connected to the thermocouple of the temperature controller (13), to sense the timer of the punch (1*a*) and the dieset (1), at least three electronic timers (11), the input of the first electronic timer being connected in parallel to the other timer, the electric current to this timer being applied through the input of the said timer, the output of the last timer being connected to the respective solenoid valves (9), the output of the photosensor being connected to the first timer and one of the outputs of the first timer being connected to a counter, the control panel (14) being mounted on the main frame (8). The device of our copending patent application no. 2305/DEL/95 dated Dec. 13, 1995, has the following drawbacks.

1. The operation is not continuous.
2. Handling of the raw leaf is difficult.
3. The heating time of the die is more.
4. The gap between the die set cannot be adjusted.
5. The die and punch set is not interchangeable.
6. The operating pressure of the main pneumatic cylinder is high.
7. The material handling is labor intensive.
8. The production capacity of the machine is low.
9. The machine cannot be moved from place to place.
10. The machine vibrates during the operation.
11. Productivity is low.
12. The operation and maintenance is expensive.

Thus, there is a need to provide an improved device that overcomes the aforesaid drawbacks and provides features such as continuous production of bio-plates, high productivity, less hardship for manual labor, less vibration, interchangeable die set and a provision to adjust the gap between the punch and the die.

OBJECTS OF THE PRESENT INVENTION

The main object of the present invention is to provide a continuous device useful for casting/shaping of bio-plates.

Another object of the present invention is to provide a continuous device, which can handle raw material with ease.

A further object of the present invention is to provide a continuous device useful for casting/shaping of bio-plates, wherein the die is heated by an electric heating coil.

Still another object of the present invention is to provide a continuous device useful for casting/shaping in large volumes/higher capacities.

Yet another object of the present invention is to provide a continuous device useful for casting/shaping with least manual drudgery and make the process of casting operator friendly.

Still another object of the present invention is to provide a continuous device useful for casting/shaping with out vibrations.

Still yet another object of the present invention is to provide a continuous device useful for casting/shaping wherein the gap between the punch and the die can be adjusted.

Yet another object of the present invention is to provide a continuous device useful for casting/shaping which has provision for interchangeability for the die set.

Still another object of the present invention is to provide a continuous device useful for casting/shaping, which can be moved from place to place.

Still yet another object of the present invention is to provide a continuous device useful for casting/shaping with high productivity.

SUMMARY OF THE INVENTION

Accordingly, the present invention provides a continuous bio-plate casting machine for continuous casting of articles such as cups, saucers, plates etc. from plant parts such as leaves/sheaths. The articles thus prepared are useful for various purposes, particularly for serving or holding food articles, serving food.

BRIEF DESCRIPTION OF THE ACCOMPANYING DRAWINGS

In the drawings accompanying the specification,

DETAILED DESCRIPTION OF THE PRESENT INVENTION

Figure 1:
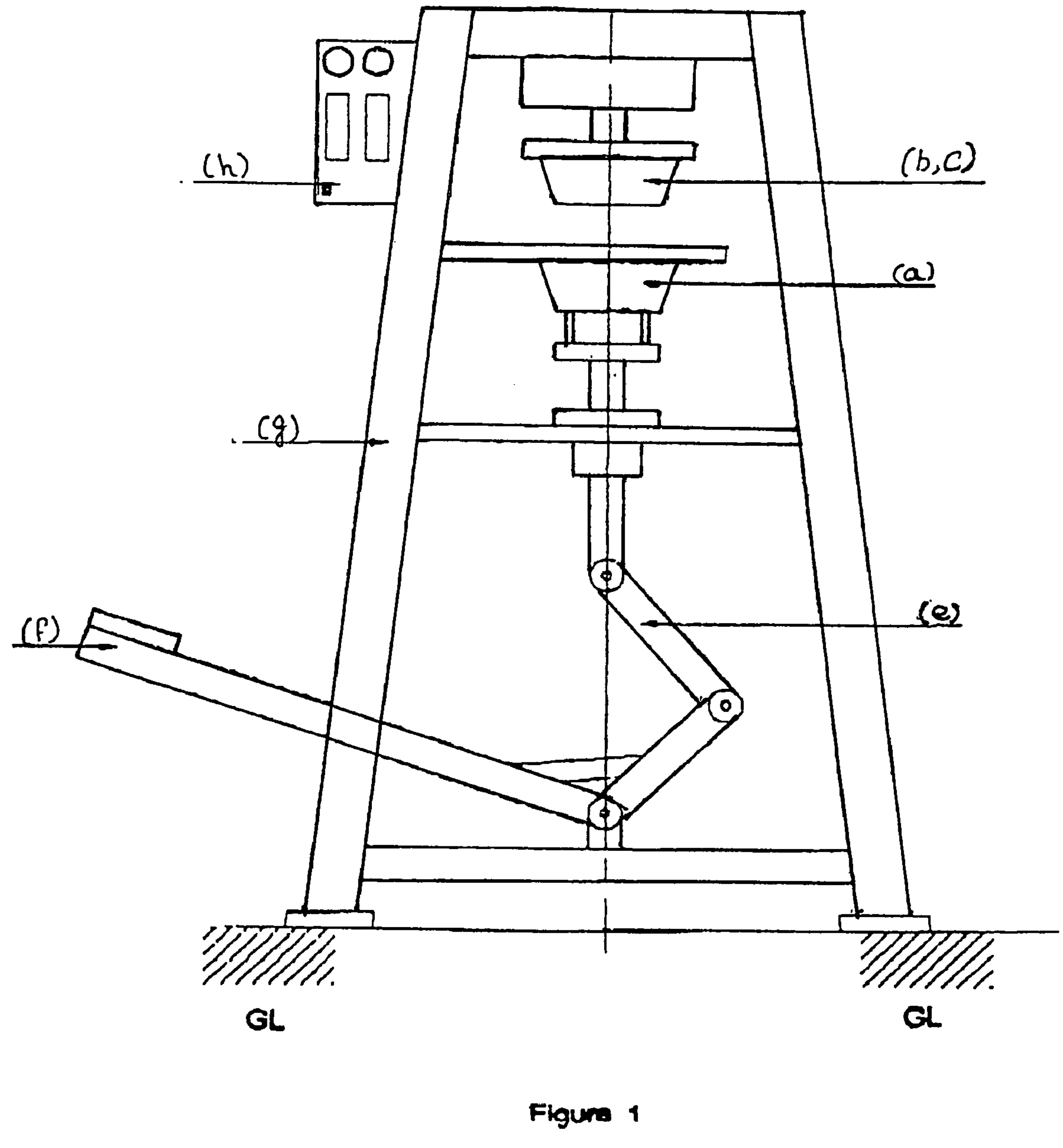
FIG. 1 represents the manually operated bio-plate casting machine developed by the Applicants and already available.
Figure 2:
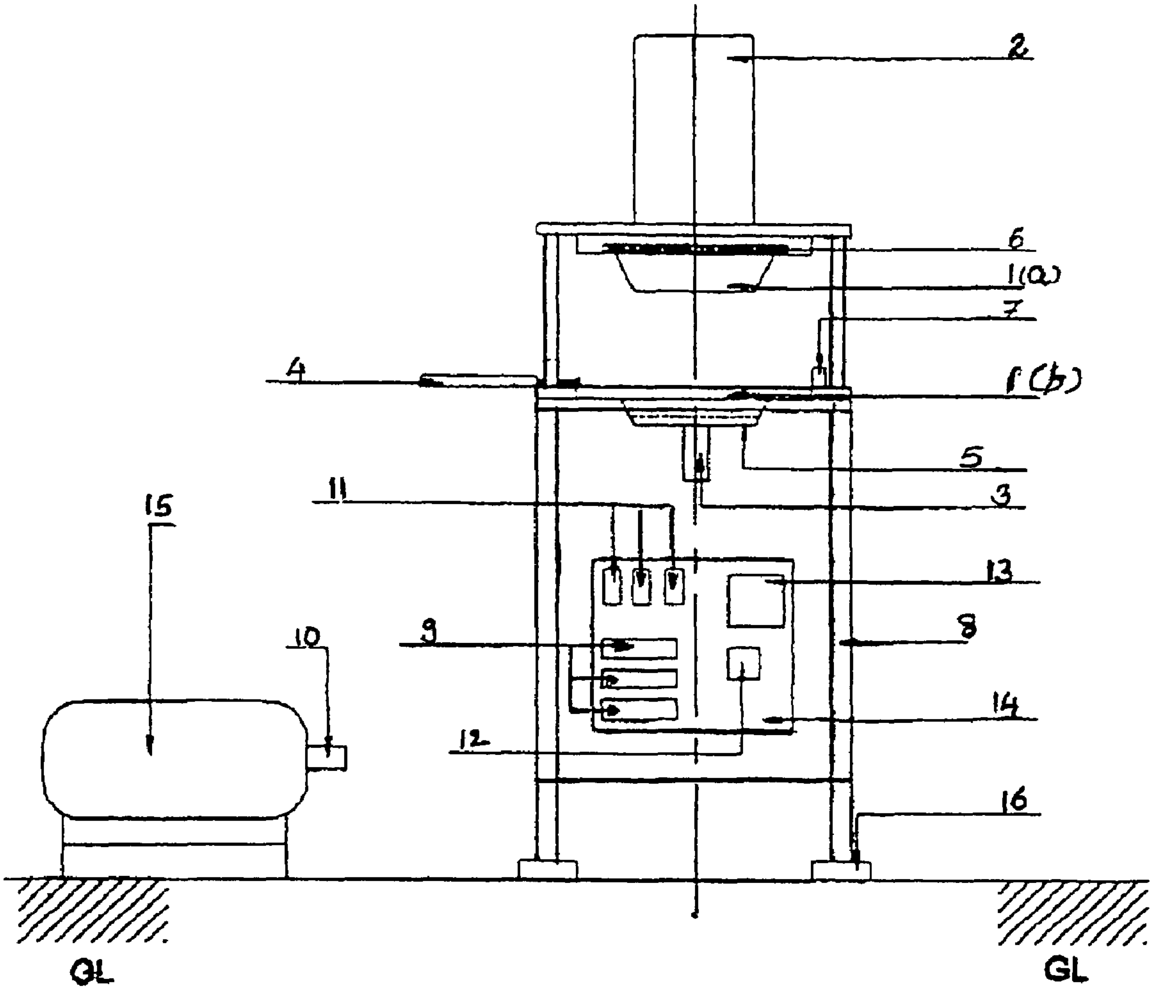
FIG. 2 represents the bio-plate casting machine described in the Applicants co-pending Indian Patent Application No. 2305/Del/95.

The present invention provides a continuous bio-plate casting/shaping machine for continuous casting of cups, plates or saucers from plant parts, the said machine comprises of:

i) a prime mover assembly (17, 18, 19) mounted on a main frame (39) and connected to a bottom end of a rotatable drive shaft (20) by a one or more coupling means (40) for providing rotational motion to the drive shaft;

ii) the rotatable drive shaft (20) being supported by a top arrestor (22) at a top end and by a bearing housing with bearings (21) near its center and said bearing housing with bearing being mounted on the main frame;

iii) a die frame coupler with keys (24) being mounted on the rotatable drive shaft (20) such that the die frame rotates along with the drive shaft, said die frame coupler with keys being held at its position by a connecting means (33);

iv) a die frame (30) being mounted on the die frame coupler with keys using one or more fasteners, said die frame also being mounted with one or more adjustable die holders (25), adjustable punch holders (27) and anti-friction cam followers (26);

v) said adjustable die holder being mounted with dies (28) and said adjustable punch holder being mounted with punches (29);

vi) a railing cam (31) being mounted on the main frame through adjustable die holder along with anti-friction cam follower for imparting vertical motion of the die holder for casting/shaping the bio-plates;

vii) the adjustable punch holder (27) being provided with electric heating coils (32) for generating the heat required for forming the required shape;

viii) said main frame being mounted with a temperature sensor and controller (34) for sensing and controlling the temperature of the punches (29), and ix) a commutator assembly (37) being mounted near the top end of the rotatable drive shaft (20) for transmission of electric power from a stationery electrical source to the electric heating coils (32).

In an embodiment of the present invention, the prime mover assembly comprises of an electric motor (17), a gear box (18) and a power transmission means (19).

In another embodiment of the present invention, the power transmission means used is a set of pulleys and belt.

In yet another embodiment of the present invention, the drive shaft (20) is provided with a set of couplings (40) for transmission of rotational motion from the prime mover assembly to the drive shaft.

In still another embodiment of the present invention, the drive shaft (20) is supported inside the bearing housing with bearings (21) through which the shaft passes.

In one more embodiment of the present invention, the bearing housing with bearings is mounted on the main frame (39) by means of fasteners.

In one another embodiment of the present invention, the drive shaft (20) is supported at the top end by a top arrestor with bearing (22) and support columns (23).

In a further embodiment of the present invention, the support column (23) is mounted on the main frame by fasteners.

In an embodiment of the present invention, the electric heating coil (32) is mounted on the adjustable punch holder (27) for application of heat to the plant material for thermosetting.

In another embodiment of the present invention, the commutator assembly (37) is mounted on the drive shaft (20) for electric power transmission from a stationery electric source to the electric heating coils which are mounted on the rotating punches (29).

In yet another embodiment of the present invention, the temperature controller with sensor (34) is mounted on the main frame (39) for varying the temperature of punch (29) for heat treatment.

In still another embodiment of the present invention, a hood (38) is used for covering the electrical parts and punches (29).

In one more embodiment of the present invention, an electric circuit breaker (36) is being provided for safe operation of the machine and all electrical parts.

In a further embodiment of the present invention, the complete machine is mounted on a set of castor wheels (35) for easy movement.

In an embodiment of the present invention, the electric motor, the gearbox and die set mounted on the die frame coupler and the railing cam is used for rotating the die set for the production of bio-plates continuously.

In another embodiment of the present invention, the electric heating coil heats the punch and the thermostat controls the temperature of the punch for producing bio-plates of uniform quality and dimension.

In yet another embodiment of the present invention, the temperature is varied depending upon the plant part being used and the moisture content in the plant part being used.

In still another embodiment of the present invention, the plant part being used is selected from leaves or sheaths.

In one more embodiment of the present invention, the temperature of the heating coil is maintained between 130 to 150° C.

The machine of the present invention employs a mechanism of interchangeability of the die set and provides provisions for adjusting the gap between the punch and the die which will make the continuous device user friendly and capable of processing raw materials having different thickness.

In the present invention, the raw material is trimmed and conditioned for ease of handling before feeding it into the continuous casting machine unit.

The continuous casting machine of the present invention is mounted on castor wheels and hence, can be moved from place to place and due to low rotational speed, there is no vibration during the process of casting/shaping.

Figure 3:
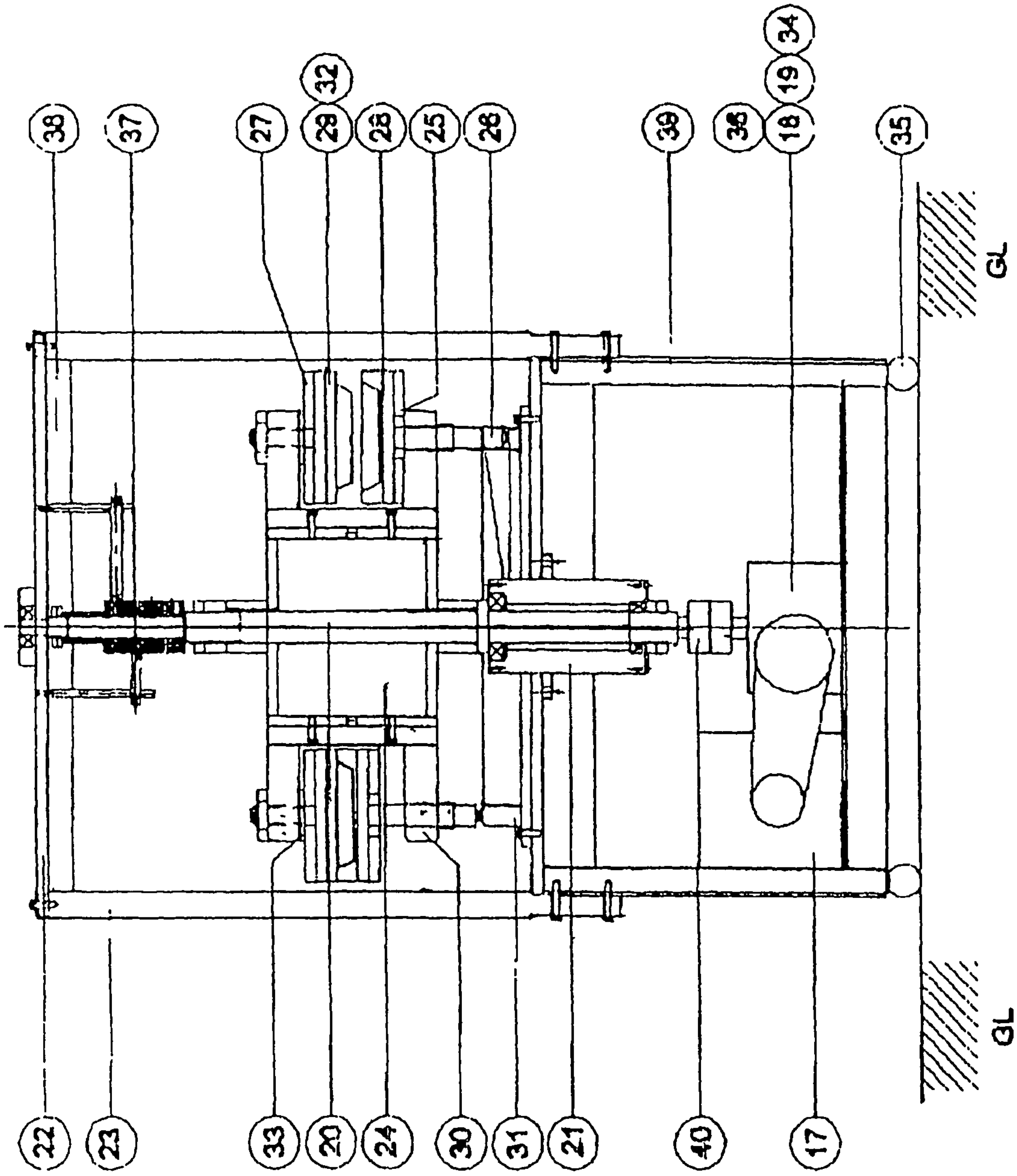
FIG. 3 represents the bio-plate casting machine of the present invention.

In the drawing accompanying this specification, FIG. 3 represents an embodiment of the device of the present invention for continuous production of bio-plates, cups, saucers etc.

In the following paragraph the continuous casting machine is described with reference to FIG. 3. The following paragraphs and the examples are given by way of illustration and should not be considered to restrict the scope of the present invention in any manner. For instance, depending on the availability of raw material (leaves/sheaths) any leaf/leaf sheaths can be used. Also, a person of ordinary skill in the art can achieve shapes other than what are mentioned in the examples by using appropriate die and casting.

The continuous casting machine of the present invention consists of an electric motor (17), a gear box (18), a set of pulleys and belt (19), a drive shaft (20), a bearing housing with bearings (21), top arrestor with bearing (22), support columns with fasteners (23), die frame coupler with keys (24), adjustable die holder (25), antifriction cam follower (26), adjustable punch holder (27), a dies (28), a punches (29), die frames (30), railing cams (31), electric heating coils (32), set of lock nuts (33), a temperature controller with sensor (34), a set of castors (35), electric circuit breaker (36), commutator assembly (37), a hood (38) main frame (39) and a set of couplings (40).

The present invention provides a continuous bio-plate casting machine useful for making articles for variety of purposes, particularly for serving and/or holding food products which comprises, a main frame (39) having a provision to mount an electric motor (17) a gear box (18) and is mounted on a set of castors (35) for easy movement of the device. A rotating drive shaft (20) is driven by an electric motor (17) and a gearbox (18) through a set of pulleys and belt (19), coupling (40) and is supported by a set of bearings and bearing housing (21). The rotating shaft (20) is supported at the top by a top arrestor with bearing (22) and support columns with fasteners (23). The support columns (23) are mounted on to the main frame (39) by suitable fasteners. A die frame coupler with keys (24) is mounted on the rotating drive shaft (20) and is held in position by a set of lock nuts (33). Die frames (30) is fastened to the die frame coupler with keys (24), which accommodates the adjustable die holder (25), antifriction cam followers (26) and adjustable punch holder (27). The dies (28) and the punches (29) are fastened to the adjustable die holder (25) and adjustable punch holder (27). Electric heating coils (32) is mounted on the adjustable punch holder (27) for application of heat to the plant material for thermosetting. A railing cam (31) is mounted on top of the main frame (39) for imparting vertical motion for casting/shaping of the bio-plates through adjustable die holder (25) along with antifriction cam followers (26). A commutator assembly (37) is mounted on the drive shaft (20) for transmission of electric power from a stationery electric source to the rotating punches (28). A temperature controller with sensor (34) is mounted on the main frame (39) for varying the temperature of punches (29) for heat treatment. An electric circuit breaker (36) is provided for safety of the bio-plate casting/shaping machine. A hood (38) is used for covering all the electricals as well as the punches (29). The material of construction of the machine is of iron and steel, but this should construed to limit the use other materials as well.

EXAMPLE 1

The Bauhunia leaves are collected and stored in bulk and sorted on a belt conveyor for rejecting the damaged, undersized leaves. The leaves are then trimmed to a uniform size, say 250-mm diameter. These are passed through a tunnel to which steam is sparged. The sterilized leaves are received in the gap between the punches (male) and die (female) of the device shown in FIG. 3. The die has the circular shape and the punch has a matching cavity. The die (female) which reciprocates on vertical axis, presses the leaf on to the punches, which is electrically heated by an embedded coil, and holds it in that position for a time ranging from 10 to 15 seconds. The die is lowered and the formed, cut, trimmed article is lifted and discharged manually. The resultant shaped article travels through a tunnel kept under UV radiator for a time at the range of 1-3 minutes, which is adjustable to achieve surface sterility.

EXAMPLE 2

Areca Sheaths (the leaf Sheaths of Areca catechu) are collected and stored in bulk and sorted on a belt conveyor for sizing and grading, rejecting the damaged and undesirable Sheaths. The Sheaths are trimmed to a uniform size of say 300 mm diameter. The Sheaths are conditioned and moistened in water for 0.5-1.0 min. The trimmed Sheaths are passed under a water jet spray while on a conveyor belt and collected for conditioning, and further passed through a tunnel to which steam is sparged at a pressure of 0.5-1 Kg/cm$^2$. The surface sterilized leaves are received in the gap between the die set of the device shown in FIG. 3. In the die set, the punch shaped like the frustum of a cone which is electrically heated by embedded coils to a temperature in the range of 130° C.-150° C., presses the Sheaths into the die of similar shape and holds it in that position for a time ranging from 25-30 seconds. The die moves down and formed, cut, trimmed article is lifted and discharged manually. The shaped article travels in to a tunnel kept under UV radiation for a time at the range of 1-3 min. to achieve surface sterility.

EXAMPLE 3

The Areca Sheaths are collected and stored in bulk and sorted on a belt conveyor for sizing, grading and rejecting the damaged, undersized Sheaths. The Sheaths are then trimmed to a uniform size say 250-mm diameter. In the die set, the punch shaped like the frustum of a cone which is electrically heated by embedded coils to a temperature in the range of 130° C.-150° C., presses the Sheaths into the die of similar shape, and holds it in that position for a time ranging from 25-30 seconds. The Sheaths are passed under a water jet spray while on a conveyor belt and collected. These are passed through a tunnel to which steam is sparged at a pressure of 0.5-1 kg/cm$^2$. The sterilized Sheaths are received in the gap between the die set of the device shown in FIG. 3. The die has the shape of frustrum of a cone and the die has a cavity of size 250-mm diameter. The dies (female) which reciprocates on vertical axis, presses the Sheaths on to the punch, which is electrically heated by embedded coils, and holds it in that position for a time ranging from 25 to 30 seconds. The die moves down and the formed, cut, trimmed article is lifted and discharged manually. The shaped article travels in a tunnel kept under UV radiation for a time at the range of 1-3 min. to achieve surface sterility.

EXAMPLE 4

The Bauhunia leaves are collected and stored in bulk and sorted on a belt conveyor for sizing and grading, rejecting the damaged and undesirable Sheaths. The stitched leaves of uniform size of say 300 mm diameter is passed on a conveyor to the forming machine. The surface cleaned leaves are received in the gap between the die set of the device shown in FIG. 3. In the die set, the punch shaped like the frustum of a cone which is electrically heated by embedded coils to a temperature in the range of 130° C.-150° C., presses the Sheaths into the die of similar shape and holds it in that position for a time ranging from 15-20 seconds. The die moves down and the formed, cut, trimmed article are lifted and discharged manually. The shaped article travels in a tunnel kept under UV radiation for a time at the range of 1-3 min. to achieve surface sterility.

The Main Advantages of the Invention are:

a) The device does not require application of force, manually.
b) The operation is continuous.
c) Handling of the raw leaf is easy.
d) The heat-up time of the die is less.
e) The gap between the die set can be adjusted.
f) The die and punch set is interchangeable (Different geometry of punches and dies can be fit on to the machine).
g) The compressor and the pneumatic cylinders are not needed.
h) The temperature of the die can be controlled.
i) The material handling is not labour intensive.
j) The production capacity of the machine is very high.
k) The machine can be moved from place to place.
l) The machine doesnot vibrate during the operation.
m) Productivity is high.
n) The operation of the device needs only one operator.
o) Operation and maintenance of the device is easy and cost effective.

The invention claimed is:

1. A continuous bio-plate casting/shaping machine for continuous casting of cups, plates or saucers from plant parts, the said machine comprises of:

i) a prime mover assembly (17, 18, 19) mounted on a main frame (39) and connected to a bottom end of a rotatable drive shaft (20) by a one or more coupling means (40) for providing rotational motion to the drive shaft;

ii) the rotatable drive shaft (20) being supported by a top arrestor (22) at a top end and by a bearing housing with bearings (21) near its center and said bearing housing with bearing being mounted on the main frame;

iii) a die frame coupler with keys (24) being mounted on the rotatable drive shaft (20) such that the die frame rotates along with the drive shaft, said die frame coupler with keys being held at its position by a connecting means (33);

iv) a die frame (30) being mounted on the die frame coupler with keys using one or more fasteners, said die frame also being mounted with one or more adjustable die holders (25), adjustable punch holders (27) and anti-friction cam followers (26);

v) said adjustable die holder being mounted with dies (28) and said adjustable punch holder being mounted with punches (29);

vi) a railing cam (31) being mounted on the main frame through adjustable die holder along with anti-friction cam follower for imparting vertical motion of the die holder for casting/shaping the bio-plates;

vii) the adjustable punch holder (27) being provided with electric heating coils (32) for generating the heat required for forming the required shape;

viii) said main frame being mounted with a temperature sensor and controller (34) for sensing and controlling the temperature of the punches (29), and ix) a commutator assembly (37) being mounted near the top end of the rotatable drive shaft (20) for transmission of electric power from a stationery electrical source to the electric heating coils (32).

2. A continuous bio-plate casting/shaping machine as claimed in claim 1 wherein the prime mover assembly comprises of an electric motor (17), a gear box (18) and a power transmission means (19).

3. A continuous bio-plate casting/shaping machine as claimed in claim 2 wherein the power transmission means used is a set of pulleys and belt.

4. A continuous bio-plate casting/shaping machine as claimed in claim 1 wherein the drive shaft (20) is provided with a set of couplings (40) for transmission of rotational motion from the prime mover assembly to the drive shaft.

5. A continuous bio-plate casting/shaping machine as claimed in claim 1 wherein the drive shaft (20) is supported inside the bearing housing with bearings (21) through which the shaft passes.

6. A continuous bio-plate casting/shaping machine as claimed in claim 1 wherein the bearing housing with bearings is mounted on the main frame (39) by means of fasteners.

7. A continuous bio-plate casting/shaping machine as claimed in claim 1 wherein the drive shaft (20) is supported at the top end by a top arrestor with bearing (22) and support columns (23).

8. A continuous bio-plate casting/shaping machine as claimed in claim 7 wherein the support column (23) is mounted on the main frame by fasteners.

9. A continuous bio-plate casting/shaping machine as claimed in claim 1 wherein the electric heating coil (32) is mounted on the adjustable punch holder (27) for application of heat to the plant material for thermosetting.

10. A continuous bio-plate casting/shaping machine as claimed in claim 1 wherein the commutator assembly (37) is mounted on the drive shaft (20) for electric power transmission from a stationery electric source to the electric heating coils which are mounted on the rotating punches (29).

11. A continuous bio-plate casting/shaping machine as claimed in claim 1 wherein the temperature controller with sensor (34) is mounted on the main frame (39) for varying the temperature of punch (29) for heat treatment.

12. A continuous bio-plate casting/shaping machine as claimed in claim 1 wherein a hood (38) is used for covering the electrical parts and punches (29).

13. A continuous bio-plate casting/shaping machine as claimed in claim 1 wherein an electric circuit breaker (36) is being provided for safe operation of the machine and all electricals parts.

14. A continuous bio-plate casting/shaping machine as claimed in claim 1 wherein the complete machine is mounted on a set of castor wheels (35) for easy movement.

15. A continuous bio-plate casting/shaping machine as claimed in claim 1 wherein the electric motor, gear box, and die set mounted on the die frame coupler and the railing cam is used for rotating the die set for the production of bio-plates cntinuously.

16. A continuous bio-plate casting/shaping machine as claimed in claim 1 wherein the electric heating coil heats the punch and the thermostat controls the temperature of the punch for producing bio-plates of uniform quality and dimension.

17. A continuous bio-plate casting/shaping machine as claimed in claim 1 wherein the temperature is varied depending upon the plant part being used and the moisture content in the plant part being used.

18. A continuous bio-plate casting/shaping machine as claimed in claim 1 wherein the plant part being used is selected from leaves or sheaths.

19. A continuous bio-plate casting/shaping machine as claimed in claim 1 wherein the temperature of the heating coil is maintained between 130 to 150° C.

* * * * *